US011537732B2

(12) United States Patent
Wright et al.

(10) Patent No.: US 11,537,732 B2
(45) Date of Patent: Dec. 27, 2022

(54) UNLOCKING ACCESS OF INFORMATION RESPONSIVE TO VALIDATION OF PROGRAM CODES OF VIRTUAL ENTITIES

(71) Applicant: HEWLETT PACKARD ENTERPRISE DEVELOPMENT LP, Houston, TX (US)

(72) Inventors: Joseph Wright, Houston, TX (US); Chris Davenport, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 100 days.

(21) Appl. No.: 16/859,321

(22) Filed: Apr. 27, 2020

(65) Prior Publication Data

US 2021/0334399 A1    Oct. 28, 2021

(51) Int. Cl.
| | | |
|---|---|---|
| *H04L 29/06* | (2006.01) | |
| *G06F 21/62* | (2013.01) | |
| *G06F 9/455* | (2018.01) | |
| *H04L 9/32* | (2006.01) | |
| *G06F 21/44* | (2013.01) | |
| *G06F 21/60* | (2013.01) | |

(52) U.S. Cl.
CPC ...... *G06F 21/6218* (2013.01); *G06F 9/45558* (2013.01); *G06F 21/44* (2013.01); *G06F 21/602* (2013.01); *H04L 9/32* (2013.01); *G06F 2009/45587* (2013.01)

(58) Field of Classification Search
CPC .............................. G06F 21/6218; G06F 21/44
See application file for complete search history.

(56) References Cited

U.S. PATENT DOCUMENTS

| | | | | |
|---|---|---|---|---|
| 9,626,512 | B1 * | 4/2017 | Brandwine | G06F 21/575 |
| 2014/0282889 | A1 * | 9/2014 | Ishaya | H04L 63/101 |
| | | | | 726/4 |
| 2018/0349610 | A1 * | 12/2018 | Gupta | G06F 21/51 |
| 2019/0384918 | A1 * | 12/2019 | Ndu | G06F 21/554 |
| 2021/0240839 | A1 * | 8/2021 | Tsirkin | G06F 21/31 |

OTHER PUBLICATIONS

Chris Rosen, "How to Scale Security with a Hardware Chain of Trust," Apr. 12, 2018, pp. 1-11, The New Stack, Retrieved from the Internet on Feb. 25, 2020 at URL: <thenewstack.io/how-to-scale-security-with-a-hardware-chain-of-trust/>.

(Continued)

*Primary Examiner* — Jason K Gee
(74) *Attorney, Agent, or Firm* — Trop, Pruner & Hu, P.C.

(57) ABSTRACT

In some examples, a management controller includes a communication interface to communicate with a computing device, where the management controller is separate from a processor of the computing device. The management controller includes a management processor to perform a validation of program codes of virtual entities of the computing device, and in response to the validation of the program codes, unlock access of information in an information store to allow access of the information by the computing device, wherein the information is for use by the virtual entities of the computing device, and wherein the management processor is to block access of the information in the information store prior to the validation.

20 Claims, 4 Drawing Sheets

(56) References Cited

OTHER PUBLICATIONS

Github, "Hyper-kube-config," 2020, pp. 1-4, Retrieved from the Internet on Feb. 25, 2020 at URL: <github.com/zillow/hyper-kube-config>.
Github, "Kubernetes External Secrets," 2020, pp. 1-9, Retrieved from the Internet on Feb. 25, 2020 at URL: <github.com/godaddy/kubernetes-external-secrets>.
Kubernetes, Concepts, Feb. 11, 2020 (5 pages).
Kubernetes, Pod Overview, Dec. 26, 2019 (6 pages).
Maya Kaczorowski, "Exploring Container Security: the Shared Responsibility Model in GKE," Mar. 29, 2019, pp. 1-7, Blog, Google Cloud, Retrieved from the Internet on Feb. 25, 2020 at URL: <cloud.google.com/blog/products/containers-kubernetes/exploring-container-security-the-shared-responsibility-model-in-gke-container-security-shared-responsibility-model-gke>.
Raffaele Spazzoli, "Managing Secrets on OpenShift—Vault Integration," May 9, 2017, pp. 1-12, Red Hat, Inc., Retrieved from the Internet on Feb. 25, 2020 at URL: <blog.openshift.com/managing-secrets-openshift-vault-integration/ >.
The Kubernetes Authors, "TLS Bootstrapping," 2020, pp. 1-16, Retrieved from the Internet on Feb. 25, 2020 at URL: </kubernetes.io/docs/reference/command-line-tools-reference/kubelet-tls-bootstrapping/>.
Uday Savagaonkar, "Titan in Depth: Security in Plaintext," Aug. 25, 2017, pp. 1-7, Blog, Google Cloud, Retrieved from the Internet on Feb. 25, 2020 at URL: <cloud.google.com/blog/products/gcp/titan-in-depth-security-in-plaintext>.

* cited by examiner

UNLOCKING ACCESS OF INFORMATION RESPONSIVE TO VALIDATION OF PROGRAM CODES OF VIRTUAL ENTITIES

BACKGROUND

A computing device can include virtual entities, such as containers or virtual machines (VMs). Each virtual entity can be initialized and configured to run in the computing device. The initialization and configuration of each virtual entity can be based on configuration data and other information.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "virtual entity" can refer to a logical entity within a computing device that is able to perform tasks of the virtual entity independent of another virtual entity in the computing device. An example of a virtual entity is a container. Another example of a virtual entity is a virtual machine (VM). In examples where a virtual entity is a container or VM, the virtual entity provides a virtual environment in which a program (or multiple programs) can execute such that the program(s) executing in the virtual environment is isolated from program(s) in other virtual environments (other containers or VMs).

Containers are similar to VMs, but containers have relaxed isolation properties to share a host OS of a computing device among multiple application programs executing in the containers. Containers provide a way to virtualize the host OS so that multiple workloads (of application programs in the containers) can run on a single instance of the host OS. In contrast, VMs have respective guest OSes running in the corresponding VMs. An application program in a VM runs in the environment of the guest OS of the VM.

A virtual entity can initialize and execute in a computing device based on configuration data. A "configuration data" for a virtual entity can define various properties of the virtual entity. For example, the configuration data can include a specification (e.g., in the form of a template) that defines the name, functions, and other properties of the virtual entity. As another example, the configuration data can specify values of variables, tasks to be performed by the virtual entity, and so forth.

In some cases, the configuration data of virtual entities may be stored in an unsecured or inadequately secured storage location in a computing device, which may allow an attacker to gain unauthorized access or to cause corruption of the configuration data. For example, in some cases, the configuration data may be stored with an OS of the computing device, which may be subject to an attack by an attacker. An attacker can refer to malware, a human hacker, or any other entity that is not authorized to perform an operation or to access information of a computing device. An attacker may attack the configuration data by modifying the configuration data so that the virtual entity does not behave in an expected manner, deleting or otherwise corrupting the configuration data such that the virtual entity is unable to run, retrieving the configuration data as part of stealing the data, and so forth.

If the configuration data is compromised, then the virtual entity may not be able to execute at all, or may not execute properly. In other cases, if the configuration data is compromised, an attacker may gain unauthorized access to a resource or data in the computing device. In further examples, if the configuration data is retrieved by an unauthorized entity, then the unauthorized entity can use the configuration data in an unauthorized way.

In accordance with some implementations of the present disclosure, a management controller that is separate from a processor of a computing device can be used for validating program code of virtual entities in the computing device. In response to the validation of the program code, the management controller unlocks access of information in an information store to allow access of the information by the computing device, where the information is for use by the virtual entities of the computing device, and where the management controller is to block access of the information in the information store prior to the validation.

Figure 1:
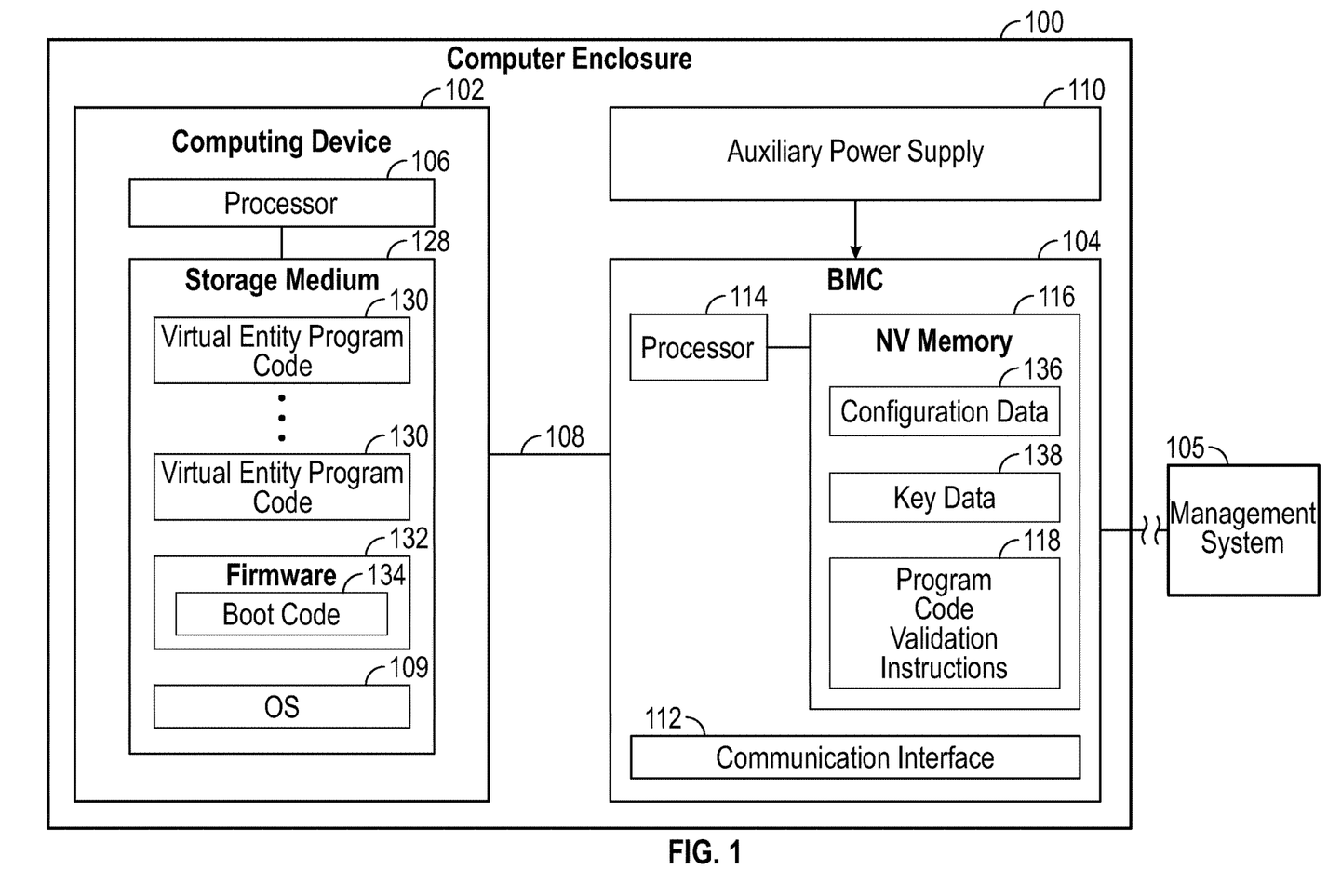
FIGS. 1 and 2 are block diagrams of computer enclosures that include virtual entities and a management controller according to some examples.

FIG. 1 is a block diagram of a computer enclosure 100 that includes a computing device 102 and a baseboard management controller (BMC) 104. The BMC 104 is an example of a management controller that is separate from a processor 106 of the computing device 102. A processor can include a microprocessor, a core of a multi-core microprocessor, a microcontroller, a programmable integrated circuit, a programmable gate array, or another hardware processing circuit.

The BMC 104 is able to communicate with the computing device 102 over a secure connection 108 between the computing device 102 and the BMC 104.

A "secure connection" can refer to any communication medium, whether physical or logical, that protects the BMC 104 from unauthorized access by an attacker. For example, the BMC 104 may reside on a communication channel (e.g., a bus, a network, etc.) that is not accessible by programs that may run in the computing device 102, such as application programs or an operating system (OS). In other examples, communications over the secure connection 108 can be protected, such as by an encryption mechanism where information exchanged between the BMC 104 and the computing device 102 is encrypted.

In some examples, a "computing device" can include any or some combination of the following: a server computer, a desktop computer, a notebook computer, a tablet computer, a smart phone, a communication node (e.g., a switch, a router, etc.), a storage server, a vehicle or a controller of the vehicle, and so forth.

Although FIG. 1 shows the computer enclosure 100 including just one computing device 102, in other examples, the computer enclosure 100 can include multiple computing devices. In such examples, the computer enclosure 100 can be in the form of a rack that holds a number of computing devices. The BMC 104 (or alternatively, multiple BMCs) can communicate with the multiple computing devices in the computer enclosure 100.

As used herein, a "BMC" is a specialized service controller that monitors the physical state of a computing device (such as 102) using sensors and communicates with a management system 105 (that is remote from the computer enclosure 100, for example) through an independent "out-of-band" connection. The BMC 104 may also communicate with applications executing at an OS level through an input/output controller (IOCTL) interface driver, a Representational state transfer (REST) application program interface (API), or some other system software proxy that facilitates communication between the BMC 104 and application programs. The BMC 104 may have hardware level access to hardware components located in the computing device. The BMC 104 may be able to directly modify the hardware components (such as settings or configurations of the hardware components). The BMC 104 may operate independently of an OS 109 of the computing device 102. The BMC 104 may be located on the motherboard or main circuit board of the computing device 102 to be monitored by the BMC 104. The fact that the BMC 104 is mounted on a motherboard of the managed computing device 102 or otherwise connected or attached to the managed computing device 102 does not prevent the BMC 104 from being considered separate from a processing resource (e.g., 106 in the computing device 102) that executes the OS 109. The BMC 104 has management capabilities to manage components of the computing device 102. Examples of management capabilities of the BMC 104 can include any or some combination of the following: power control to perform power management of the computing device 102 (such as to transition the computing device between different power consumption states in response to detected events), thermal monitoring and control of the computing device 102 (such as to monitor temperatures of the computing device and to control thermal management devices of the computing device), fan control of fans in the computing device 102, system health monitoring based on monitoring measurement data of various sensors of the computing device 102, remote access of the computing device 102 (to access the computing device over a network, for example), remote reboot of the computing device 102 (to trigger the computing device to reboot using a remote command), system setup and deployment of the computing device 102, system security to implement security procedures in the computing device 102, and so forth.

In some examples, the BMC 104 can provide so-called "lights-out" functionality for computing devices. The lights out functionality may allow a user, such as a systems administrator, to perform management operations on the computing device 102 even if the OS 109 is not installed or not functional on the computing device 102.

Moreover, in some examples as shown in FIG. 1, the BMC 104 can run on auxiliary power provided by an auxiliary power supply 110 (e.g., a battery); as a result, the computing device 102 does not have to be powered on to allow the BMC 104 to perform the BMC's operations. The services provided by the BMC 104 may be considered "out-of-band" services, since the OS 109 may not be running and in some cases the computing device 102 may be powered off or is not functioning properly (e.g., the computing device 102 has experienced a fault or hardware failure).

The BMC 104 can include a communication interface 112, such as a network interface, and/or a serial interface, that a device of an administrator or other entity (such as the management system 105) can use to remotely communicate with the BMC 104. The communication interface 112 can include a transceiver for transmitting and receiving signals over a communication channel, as well as any protocol layer(s) associated with communication protocol(s) used for the communication of data over the communication channel. An "out-of-band" service can be provided by the BMC 104 via a dedicated management channel (e.g., the communication interface) and is available whether or not the computing device 102 is in a powered on state.

The auxiliary power supply 110 is separate from a main power supply (not shown) that provides power to the computing device 102.

The BMC 104 further includes a processor 114 and a non-volatile memory 116. The non-volatile memory 116 can be implemented using a non-volatile memory device (or multiple non-volatile memory devices), such as a flash memory device or any other type of memory device that maintains data stored in the memory device even if power is removed from the memory device.

The non-volatile memory 116 stores program code validation instructions 118 (in the form of firmware or software, for example) that are executable on the processor 114 of the BMC 104 to validate program codes of the computing device 102. The program codes of the computing device 102 includes the following program codes (including machine-readable instructions) stored in a storage medium 128 of the computing device 102: virtual entity program codes 130, firmware 132 that includes boot code 134, and the OS 109. The validation of the program codes performed by the program code validation instructions 118 includes a sequence of validation tasks (also referred to as a "root of trust" sequence) that validate different program codes in a specified order.

The storage medium 128 can be implemented using a storage device or multiple storage devices. Examples of storage devices can include any or some combination of the following: a non-volatile memory device, a disk-based storage device, a volatile memory device, and so forth.

The sequence of validation tasks can include the following sequence, for example. Upon power up of the computing device 102, the program code validation instructions 118 fetches the startup code from the storage medium 128 of the computing device 102. The startup code can include a boot block of the boot code 134. The boot code 134 executes to initialize various electronic components of the computing device 102. The boot block of the boot code 134 refers to an initial part of the boot code 134 that is used to perform initial startup of the computing device 102.

The program code validation instructions 118 are executable to validate the startup code, such as by computing a hash value based on a hash function applied on the startup code, and comparing the computed hash value with a stored hash value to determine whether or not the startup code is a valid (i.e., has not been modified in an unauthorized manner). The hash function can be a cryptographic hash function, such as a secure hash algorithm (SHA) function, a hash-based message authentication code (HMAC) hash function, also referred to as a Keyed-Hashing for Message Authentication hash function, as described by Request for Comments (RFC) 6151, dated February 1997, a bcrypt hash function, and so forth.

If the program code validation instructions 118 successfully validate the startup code, the BMC 104 can take the processor 106 of the computing device 102 out of reset and allows the computing device 102 to fetch an additional portion of the program codes. For example, successive portions of the boot code 134, and then the firmware 132, can be fetched as the respective program codes are validated by the program code validation instructions 118 of the BMC 104. Once the firmware 132 is validated, the kernel of the OS 109 can be retrieved for validation by the program code validation instructions 118, followed by retrieval and validation of a remaining portion of the OS 109. Once the OS 109 is validated, the program code validation instructions 118 of the BMC 104 can validate an application stack of the computing device 102. In some examples, the application stack can include the virtual entity program codes 130 of the computing device 102.

Each virtual entity program code 130 when executed by the computing device 102 provides a respective virtual entity in the computing device 102. The virtual entities provided by the respective virtual entity program codes 130 can include containers, VMs, and so forth. The program code validation instructions 118 of the BMC 104 when executed by the BMC 104 can validate the virtual entity program codes 130.

Validating each program code of the computing device 102 can employ hash values as discussed above for validating the startup code. In other examples, a program code can be validated based on use of encryption keys, cryptographic signatures, and so forth. Encryption keys can be used to decrypt encrypted program code to determine whether the encrypted program code can be successfully decrypted. A cryptographic signature can be used to determine whether the signature associated with a program code is a valid signature.

As shown in FIG. 1, the non-volatile memory 116 further stores configuration data 136 for virtual entities corresponding to the virtual entity program codes 130 of the computing device 102. More specifically, the configuration data 136 can be accessed by a respective virtual entity program code 130 for configuring the respective virtual entity to be launched in the computing device 102. Examples of the configuration data 136 include those configuration data discussed further above.

In accordance with some implementations of the present disclosure, the configuration data 136 stored in the non-volatile memory 116 of the BMC 104 remains locked from access by the computing device 102 (or and more specifically, by a virtual entity program code 130 in the computing device 102) until the sequence of validation tasks has been successfully completed by the program code validation instructions 118 executed by the BMC 104. In some examples, locking the configuration data 136 from access can refer to a mechanism or technique by which a request for the configuration data 136 is denied by the BMC 104.

In further examples, locking the configuration data 136 from access can refer to preventing a key (such as an encryption key) from being communicated to a virtual entity program code 130 such that the virtual entity program code 130 is unable to decrypt the configuration data 136, which may be stored in the non-volatile memory 116 in encrypted form. The key can be stored as part of key data 138 in the non-volatile memory 116. Once the encryption key (or more specifically, a decryption key) is provided to the virtual entity program code 130, the virtual entity program code 130 is able to decrypt the encrypted configuration data 136 to access the configuration data 136 once decrypted.

In some examples, the key data 138 can also include an authentication key (or multiple authentication keys) that virtual entities corresponding to the virtual entity program codes 130 can use to authenticate one another. For example, multiple virtual entities may be part of a cluster of virtual entities, and such virtual entities can interact with one another to perform specified tasks. The interactions among the virtual entities is made secure by allowing the virtual entities to authenticate one another using the authentication key(s).

Figure 2:
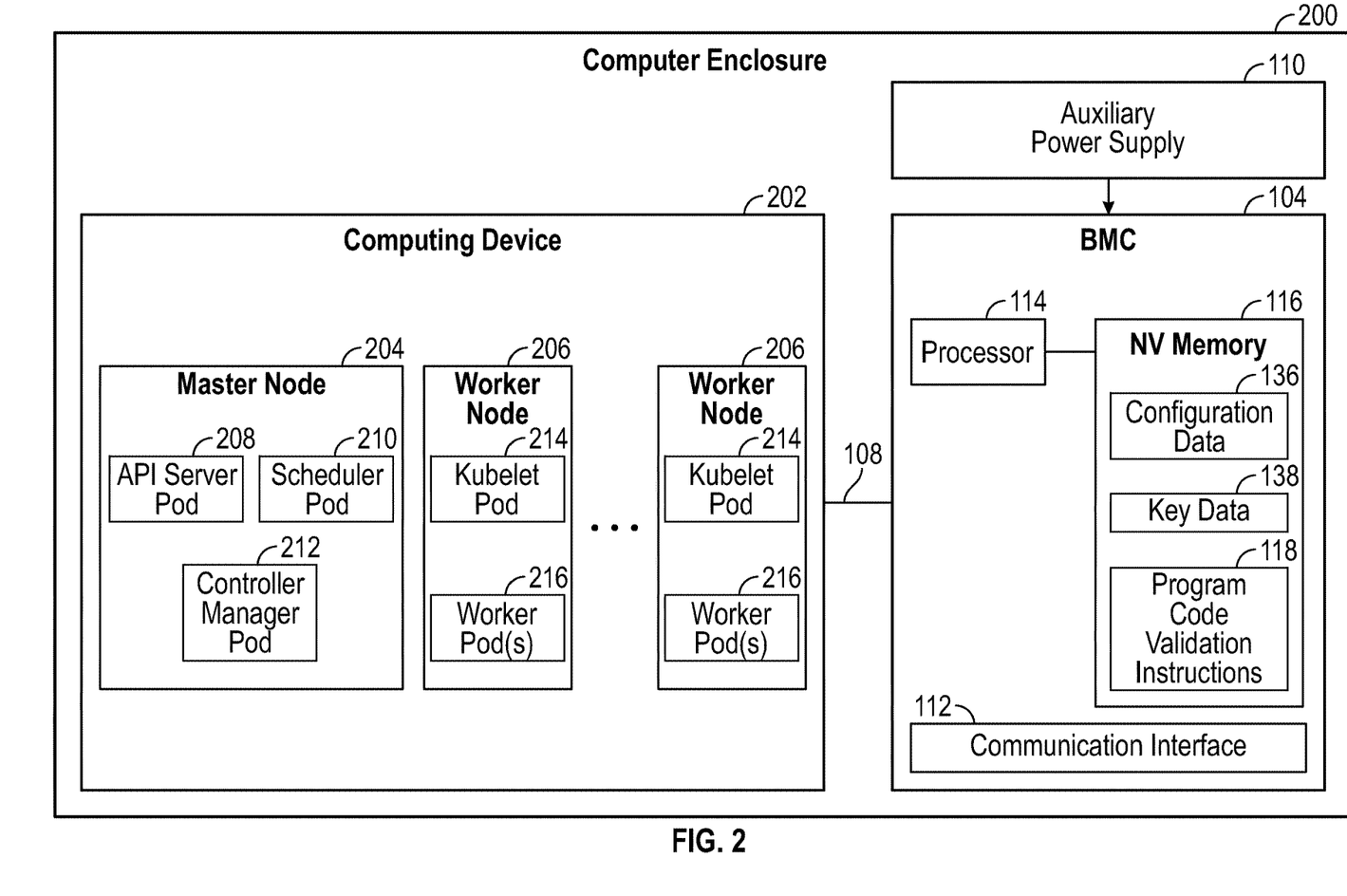

FIG. 2 shows an example of a computer enclosure 200 that includes a computing device 202 arranged to provide a containers according to KUBERNETES. KUBERNETES provides a portable, extensible, open-source platform for managing containerized workloads and services, which facilitates both declarative configuration and automation.

The KUBERNETES platform includes a KUBERNETES control plane (also referred to as a KUBERNETES master) and a number (one or greater than one) of KUBERNETES workers. The master and worker(s) together form a cluster.

The master refers to a collection of processes for managing the cluster's state. The processes of the master can be executed in a master node 204. A "node" refers to a worker machine, which can be in the form of a VM or a physical machine.

The processes of a worker are run on a worker node 206. A cluster can include the master node 204, and a number (one or greater than one) of worker nodes 206. A worker node 206 runs a containerized application program. More specifically, a worker node 206 hosts pods that are the components of the workload of the application program running in the worker node 206. The master node 204 also hosts pods that provide the processes of the master for managing the cluster.

A "pod" is the basic execution unit in a KUBERNETES environment. Stated differently, a pod is the smallest and simplest unit in the KUBERNETES object model that can be created or deployed. A pod represents process(es) running in the cluster. A pod can run a single container, or can run multiple containers that work together.

A pod encapsulates an application's container (or, in some cases, multiple containers), storage resources, a unique network address (e.g., an Internet Protocol or IP address), and options that govern how the container(s) should run.

In some examples, the processes of the master node 204 in a KUBERNETES environment can include an application programming interface (API) server pod 208, a scheduler pod 210, and a controller manager pod 212.

The API server pod 208 exposes the API of the KUBERNETES control plane, where the API supports retrieving, creating, updating, and deleting resources, such as by using Hypertext Transfer Protocol (HTTP) commands.

The scheduler pod 210 can watch for newly created pods, and selects a worker node 206 to run each newly created pod. In some examples, factors taken into account for scheduling decisions can include any or some combination of the following: resource requirements, hardware/software/policy constraints, affinity and anti-affinity specifications, data locality, inter-workload interference, deadlines, and so forth.

The controller manager pod 212 can detect and respond to when worker nodes 206 go down, creating accounts and API access tokens, and so forth.

Although specific example processes of the master node 204 are listed, in other example, other processes can run in the worker node 206.

In the KUBERNETES environment, each worker node 206 can run a kubelet pod 214 and a number (one or greater than one) of worker pods 216. The kubelet pod 214 can communicate with the master to allow the worker node 206 to be controlled by the master (or more specifically, to be controlled by the processes of the master node 204). Each worker pod 216 runs the workload of an application program hosted by the worker node 206. Although not shown, a worker node 206 can also run a proxy pod, which is a network proxy that maintains network rules for the cluster.

The computer enclosure 200 further includes the BMC 104 to perform tasks similar to those of the BMC 104 of FIG. 1. More specifically, the program code validation instructions 118 can validate program codes of the computing device 202, including the program codes for the KUBERNETES master and worker(s), in addition to the other program codes depicted in FIG. 1. The BMC 104 can lock access of the configuration data 136 stored in the non-volatile memory 116 of the BMC until the program code validation instructions 118 have successfully validated the program codes of the computing device 202, including the program codes for the master node at 204 and the worker node(s) 206.

Figure 3:
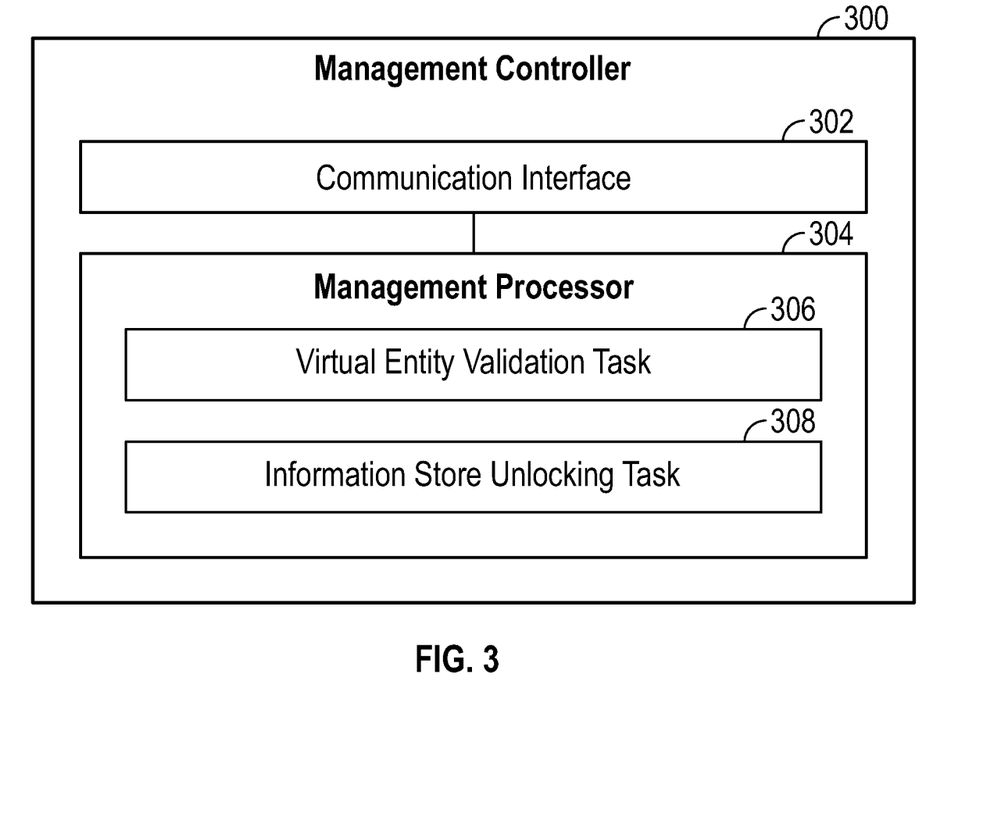
FIG. 3 is a block diagram of a management controller, according to some examples.

FIG. 3 is a block diagram of a management controller 300 (e.g., the BMC 104 of FIG. 1 or 2), according to some examples. The management controller 300 includes a communication interface 302 to communicate with a computing device (e.g., 102 in FIG. 1 or 202 in FIG. 2). The management controller 300 is separate from a processor of the computing device.

The management controller 300 includes a management processor 304 to perform various tasks. The tasks of the management processor 304 include a virtual entity validation task 306 to perform a validation of program codes of virtual entities of the computing device. Examples of the virtual entities can include containers (such as provided by pods in the worker nodes 206 of FIG. 2), VMs, and so forth. In some examples, the validation can be based on computing a hash value of each of the program codes.

The tasks of the management processor 304 include an information store unlocking task 308 to, in response to the validation of the program codes, unlock access of information (e.g., the configuration data 126 of FIG. 1 or 2) in an information store (e.g., the non-volatile memory 116 of FIG. 1 or 2) to allow access of the information by the computing device. The information is for use by the virtual entities of the computing device, where the management processor 304 is to block access of the information in the information store prior to the validation.

In some examples, the management processor 304 is to unlock the access of the information in the information store by sending a key to the computing device. The key (which can be retrieved by the management processor 304 from the information store) includes a decryption key to decrypt encrypted information in the information store.

In further examples, the information in the information store that is accessed can include an authentication key for use by the virtual entities in performing authentication of one another (e.g., in examples where the virtual entities are part of a cluster).

In further examples, the management controller 300 can include a communication interface (e.g., 112 in FIG. 1 or 2) to communicate with a remote entity (e.g., 105 in FIG. 1) as part of management of the computing device.

Figure 4:
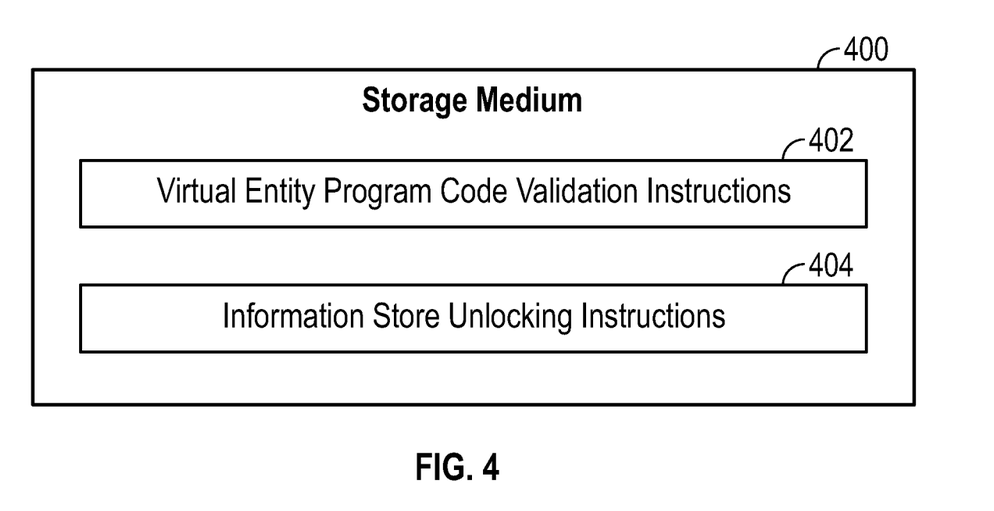
FIG. 4 is a block diagram of a storage medium storing machine-readable instructions according to some examples.

FIG. 4 is a block diagram of a non-transitory machine-readable or computer-readable storage medium 400 that stores machine-readable instructions that upon execution cause a management controller (e.g., 104 of FIG. 1 or 2) to perform various tasks.

The machine-readable instructions include virtual entity program code validation instructions 402 to perform validation of program codes of a cluster of virtual entities in a computing device (e.g., 102 of FIG. 1 or 202 of FIG. 2), where the management controller is separate from the computing device and remains powered by an auxiliary power supply (e.g., 110 of FIG. 1 or 2) even when power is removed from the computing device.

The machine-readable instructions further include information store unlocking instructions 404 to, in response to the validation of the program codes, unlock access of information (e.g., the configuration data 136 of FIG. 1 or 2) in an information store (e.g., the non-volatile memory 116 of FIG. 1 or 2) to allow access of the information by the computing device. The information is for use by the cluster of virtual entities in interacting with one another and to execute tasks of the virtual entities in the cluster of virtual entities, and the management controller is to block access of the information in the information store prior to the validation.

In some examples, the cluster of virtual entities includes a master virtual entity (e.g., a KUBERNETES master) and a worker virtual entity (e.g., a KUBERNETES worker).

Figure 5:
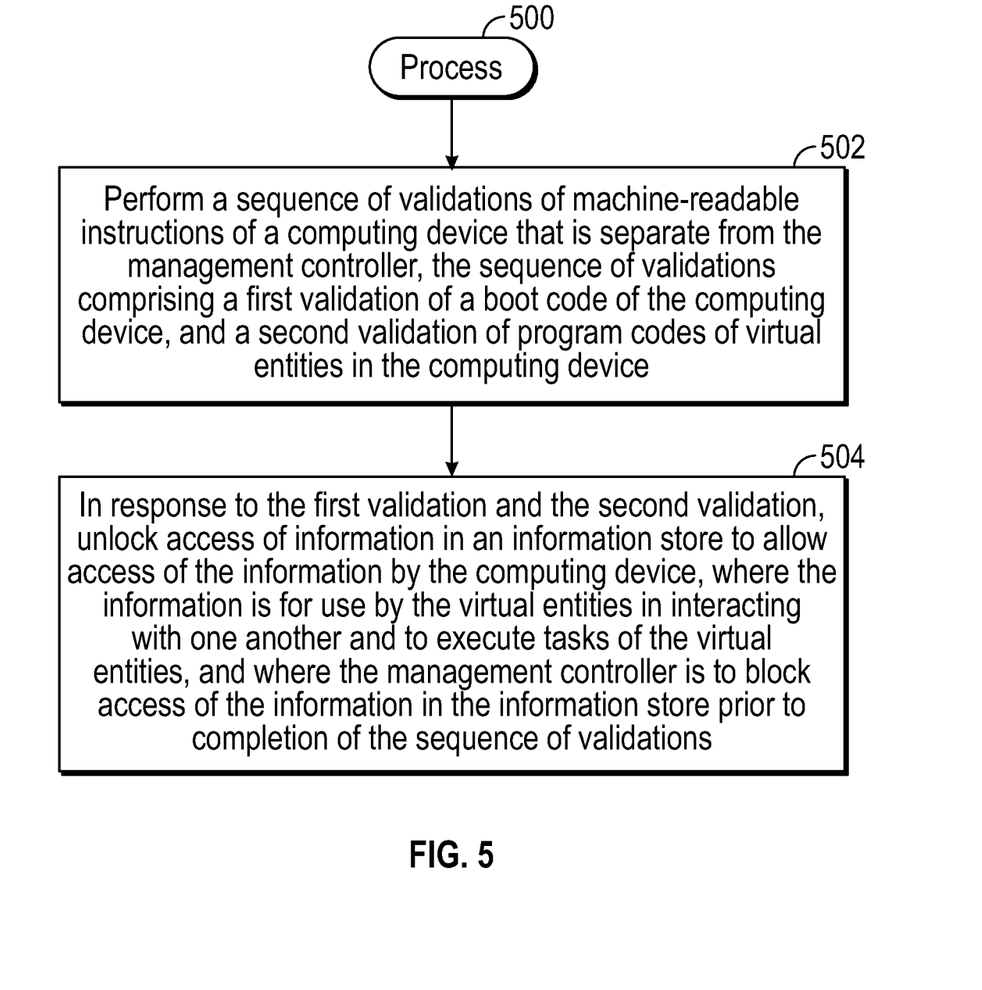
FIG. 5 is a flow diagram of a process according to some examples.

FIG. 5 is a flow diagram of a process 500 performed by a management controller (e.g., BMC 104 of FIG. 1 or 2) in some examples. The process 500 includes performing (at 502) a sequence of validations of machine-readable instructions of a computing device that is separate from the management controller, the sequence of validations comprising a first validation of a boot code of the computing device, and a second validation of program codes of virtual entities in the computing device.

The process 500 includes, in response to the first validation and the second validation, unlocking (at 504) access of information in an information store to allow access of the information by the computing device, where the information is for use by the virtual entities in interacting with one another and to execute tasks of the virtual entities, and where the management controller is to block access of the information in the information store prior to completion of the sequence of validations.

A storage medium (e.g., 116 of FIG. 1 or 2, 400 of FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computer system comprising:
   a management controller comprising:
      a memory to store an encrypted version of configuration data for virtual entities in a computing device, wherein the configuration data defines functions of the virtual entities;
      a communication interface to communicate with the computing device, wherein the management controller is separate from a processor of the computing device; and
      a management processor to:
         perform a validation of program codes of the virtual entities of the computing device,
         block access of the encrypted version of the configuration data in the memory of the management controller prior to the validation by preventing communication of a decryption key to the computing device, and
         in response to the validation of the program codes, unlock access of the encrypted version of the configuration data by sending the decryption key to the computing device, the decryption key useable by the program codes in decrypting the encrypted version of the configuration data to produce decrypted configuration data defining the functions of the virtual entities;
   a processor; and
   a storage medium storing the program codes that are executable on the processor to configure the virtual entities using the decrypted configuration data defining the functions of the virtual entities.

2. The computer system of claim 1, wherein the virtual entities comprise containers, and wherein the validation of the program codes comprises a validation of program codes of the containers in the computing device.

3. The computer system of claim 1, wherein the virtual entities comprise virtual machines, and wherein the validation of the program codes comprises validation of program codes of the virtual machines in the computing device.

4. The computer system of claim 1, wherein the memory is to further store the decryption key.

5. The computer system of claim 1, wherein the configuration data further specifies values of variables.

6. The computer system of claim 1, wherein the validation of the program codes of the virtual entities is based on use of encryption keys to decrypt the program codes.

7. The computer system of claim 1, wherein the memory in the management controller is to store an authentication key, and wherein the management processor is to, in response to the validation of the program codes, unlock access of the authentication key to allow access of the authentication key by the virtual entities to perform authentication.

8. The computer system of claim 1, wherein the validation is based on computing a hash value of each of the program codes.

9. The computer system of claim 1, further comprising:
   a communication interface to communicate with a remote entity as part of a management of the computing device.

10. The computer system of claim 1, wherein the management controller is a baseboard management controller.

11. The computer system of claim 1, wherein the management processor is to:
   further validate other program codes of the computing device, prior to the validation of the program codes of the virtual entities, wherein the other program codes include a boot code and an operating system (OS).

12. The computer system of claim 7, wherein the virtual entities are to authenticate one another using the authentication key.

13. A non-transitory machine-readable storage medium comprising instructions that upon execution cause a system to:
   store, in a memory of a management controller in the system, an encrypted version of configuration data for a cluster of virtual entities in a computing device of the system, the configuration data defining functions of the virtual entities in the cluster of virtual entities;
   perform validation of program codes of the cluster of virtual entities, wherein the management controller is separate from the computing device and remains powered by an auxiliary power supply even when power is removed from the computing device;
   block access of the encrypted version of the configuration data in the memory of the management controller prior to the validation by preventing communication of a decryption key to the computing device;
   in response to the validation of the program codes, unlock access of the encrypted version of the configuration data by sending the decryption key to the computing device;
   decrypting, by the program codes using the decryption key, the encrypted version of the configuration data to produce decrypted configuration data that defines the functions of the virtual entities in the cluster of virtual entities; and
   configure the virtual entities of the cluster of virtual entities using the decrypted configuration data that defines the functions of the virtual entities in the cluster of virtual entities.

14. The non-transitory machine-readable storage medium of claim 13, wherein the cluster of virtual entities comprises a control virtual entity and a worker virtual entity.

15. The non-transitory machine-readable storage medium of claim 14, wherein the control virtual entity comprises processes of a control node, and the worker virtual entity comprises processes of a worker node.

16. The non-transitory machine-readable storage medium of claim 13, wherein the instructions upon execution cause the system to store the decryption key in the memory of the management controller.

17. The non-transitory machine-readable storage medium of claim 13, wherein the validation of the program codes of the cluster of virtual entities is based on use of encryption keys to decrypt the program codes.

18. The non-transitory machine-readable storage medium of claim 13, wherein the instructions upon execution cause the system to:
   store an authentication key in the memory of the management controller; and
   in response to the validation of the program codes, unlock access of the authentication key to allow access of the authentication key by the virtual entities to perform authentication of one another.

19. A method comprising:

storing, in a memory of a management controller, an encrypted version of configuration data for virtual entities in a computing device, wherein the configuration data defines functions of the virtual entities;

communicating, by the management controller, with the computing device, wherein the management controller is separate from a processor of the computing device;

performing, by the management controller, a validation of program codes of the virtual entities of the computing device;

blocking, by the management controller, access of the encrypted version of the configuration data in the memory of the management controller prior to the validation by preventing communication of a decryption key to the computing device;

in response to the validation of the program codes, unlocking, by the management controller, access of the encrypted version of the configuration data by sending the decryption key to the computing device;

decrypting, by the program codes using the decryption key, the encrypted version of the configuration data to produce decrypted configuration data defining the functions of the virtual entities; and configuring the virtual entities using the decrypted configuration data defining the functions of the virtual entities.

20. The method of claim 19, comprising:

storing, in the memory of the management controller, an authentication key;

in response to the validation of the program codes, unlocking, by the management controller, access of the authentication key; and accessing, by the virtual entities, the authentication key in authenticating one another.

* * * * *